Jan. 25, 1944.   H. A. KRUEGER   2,339,864
DIVIDING HEAD
Filed Jan. 12, 1942   3 Sheets-Sheet 1
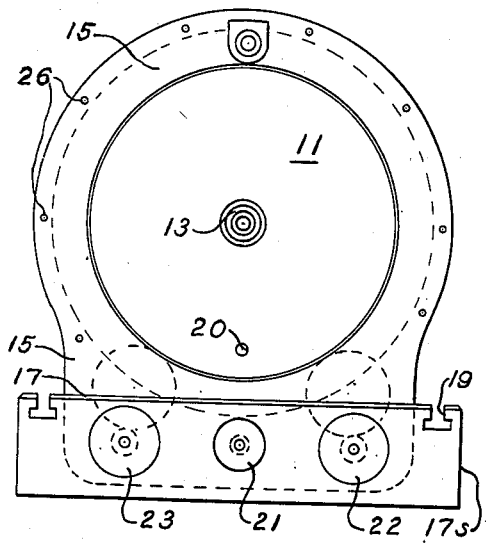
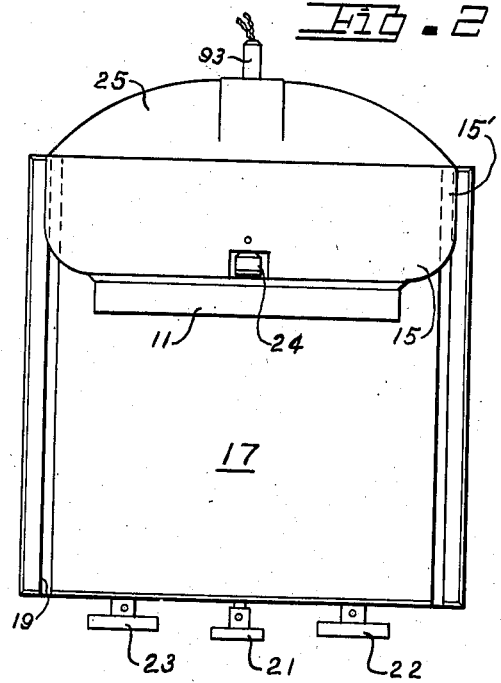
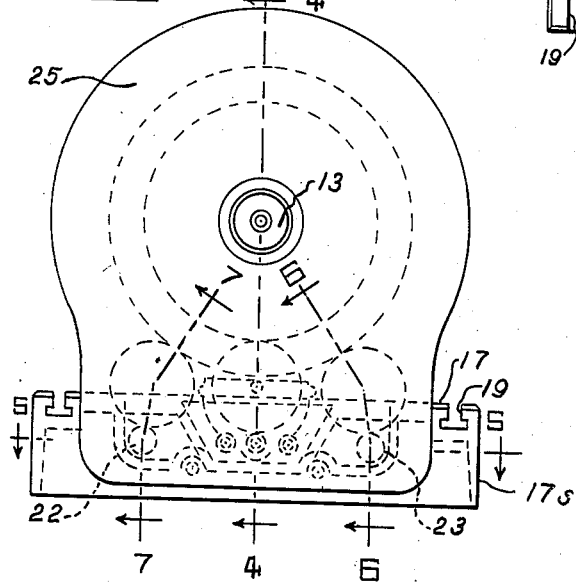
INVENTOR.
HERMAN A. KRUEGER
BY Ralph S. Binns
HIS ATTORNEY Jan. 25, 1944.   H. A. KRUEGER   2,339,864
DIVIDING HEAD
Filed Jan. 12, 1942   3 Sheets-Sheet 2
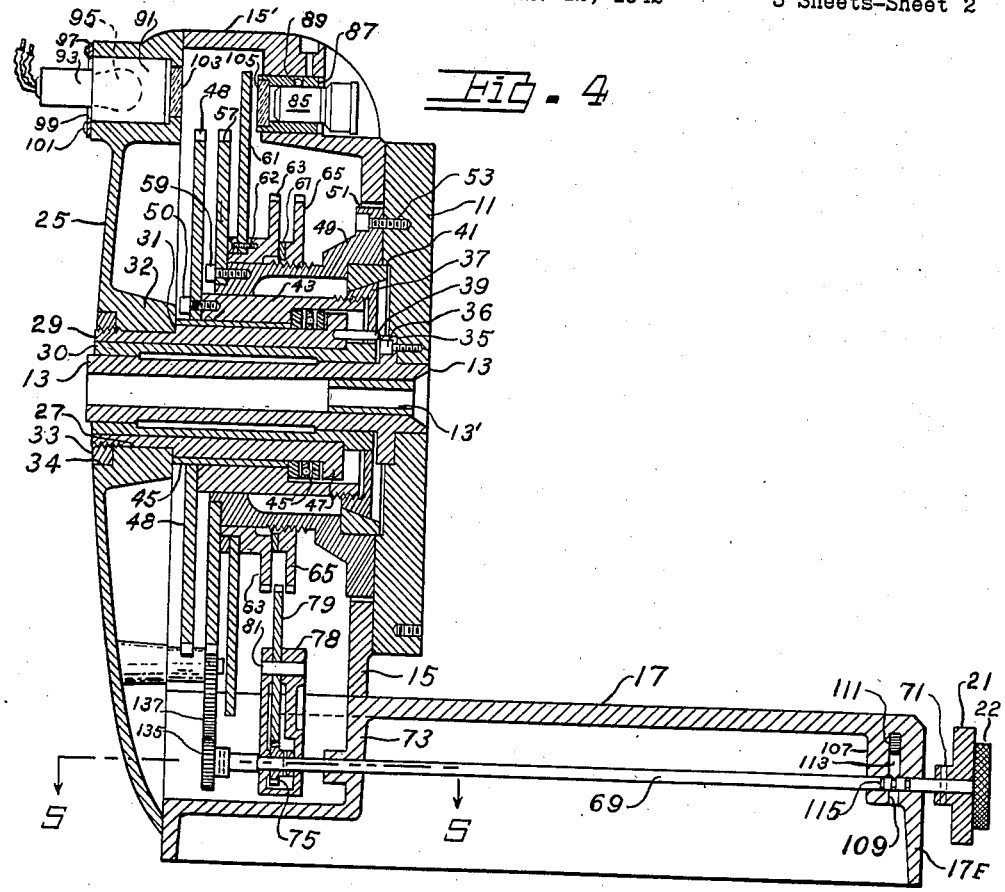
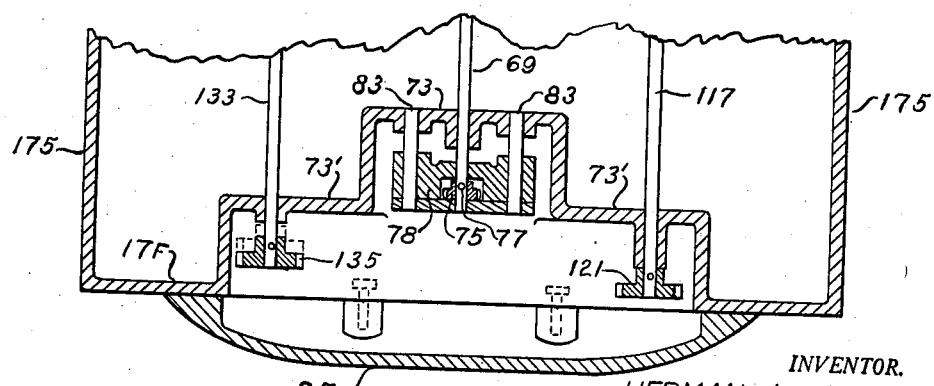
INVENTOR.
HERMAN A. KRUEGER
BY
HIS ATTORNEY

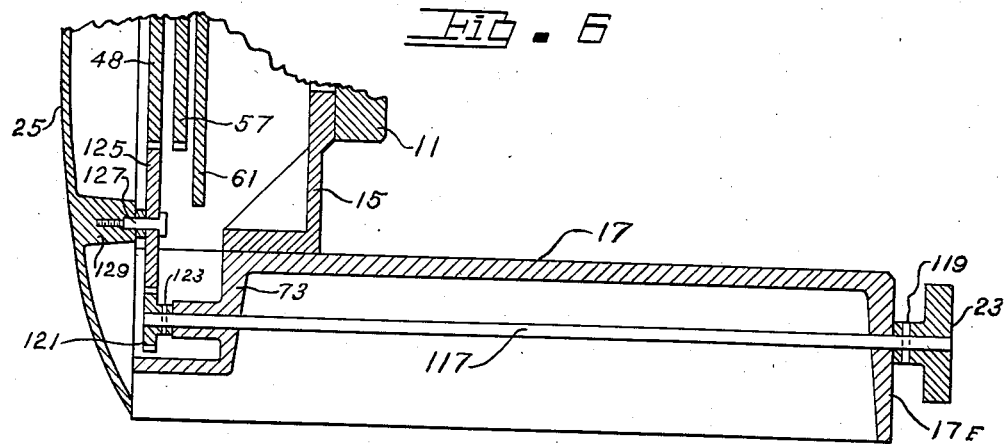
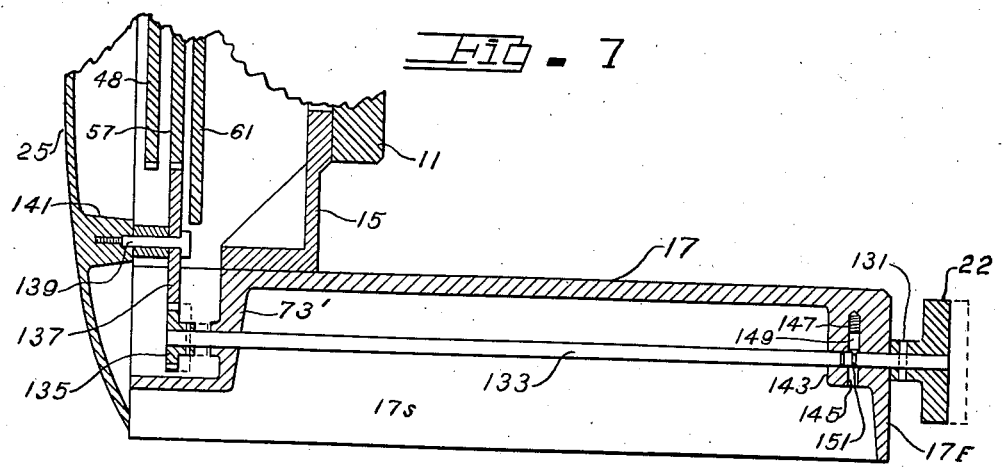

Patented Jan. 25, 1944

2,339,864

UNITED STATES PATENT OFFICE 2,339,864

DIVIDING HEAD

Herman A. Krueger, Detroit, Mich., assignor of one-half to Marcel A. Atlas, Detroit, Mich.

Application January 12, 1942, Serial No. 426,480

9 Claims. (Cl. 90—56)

My invention pertains to a measuring or indexing device and more particularly to a rotary optical direct-reading sine or checking plate.

It is an object of my invention to provide a rotary sine or layout checking plate embodying a direct optical reading arrangement and comprising a simple rugged construction.

It is also an object of my invention to provide a rotary layout checking machine or device which has improved convenience of operation and facilitates layout checking and inspection.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings of an embodiment of my invention, in which:

Fig. 1 is a front elevational view showing my improved rotary checking device;

Fig. 2 is a plan view thereof;

Fig. 3 is a rear elevational view thereof;

Fig. 4 is a sectional view taken longitudinally and vertically through the center of the apparatus, as shown by section line 4—4 in Fig. 3;

Fig. 5 is a fragmentary sectional view taken horiozntally through the rear end of the machine along the control shafts on section line 5—5 shown in Figs. 3 and 4, the front end being broken away;

Fig. 6 is a sectional view through one side of the device, along line 6—6 in Fig. 3, and partially broken away, for showing the brake controls; and Fig. 7 is a sectional view through the other side of the device along line 7—7 in Fig. 3, and partially broken away, for showing the control means for turning the indexing head to various angular positions.

Referring more specifically to Figs. 1, 2 and 3 of the drawings, my improved rotary indexing or checking device comprises a circular or disk-like plate or dividing head 11, also termed a checking or indexing plate, which is supported for rotation in a vertical plane upon a hollow shaft 13. The hollow shaft 13 is journalled horizontally in an upright structure supporting the dividing disk or head 11 in front of a bracket wall 15 rising uprightly from the rear end of a stationary base or bed plate 17. A pair of spaced parallel clamping bolt grooves 19 are provided extending along in the respective opposite sides of the base plate 17 wherein clamping bolt heads may be conveniently inserted for clamping measuring instruments, sight gauges, marking devices, calipers and the like (not shown) firmly upon the bed plate, or these may merely rest on the bed plate adjacent the rotary disk plate 11, and work secured thereon as will be readily understood. The indexing plate 11 is provided with threaded bolt holes 20, of which any desirable number may be provided, for clamping the work piece (not shown).

Projecting forwardly from the front end of the base plate are control knobs 21, 22 and 23. The knob 22 may be conveniently turned for rotating the rotary plate or dividing head 11, in a manner to be subsequently described. The bed plate 17 has downwardly extending front wall 17F and side walls 17S. The rotation and the angular position of the dividing head 11 is observed by the operator, in a magnifying viewer 24 and when the desired position has been attained the dividing head is firmly secured by turning a second knob 23 which actuates brake means, in a manner to be subsequently described. A calibrated scale is adapted to rotate with disk 11 and may be adjusted relatively thereto by turning the knob 21, in a manner to be described.

As shown in Fig. 2, the upright bracket wall 15 on one end of the base plate 17 is preferably provided with integral rearwardly disposed side walls 15' providing, together with a rear wall 25 secured by bolts 26 (Fig. 1), a rigid supporting structure and enclosing housing of few parts.

Fig. 4 shows, an aperture 27 is centrally disposed in the rear wall 25 for receiving a bearing bushing 29 having an internal bearing sleeve 30, wherein the hollow shaft 13 is rotatively journalled. The bearing bushing 29 is of reduced external diameter at the rear end providing a shoulder 31 for abutting the front end of a bearing boss 32 projecting forwardly from the back wall 25, to which it is clamped by a nut 33 threadably disposed on the rear end of the bushing and disposed flush in an annular groove 34 in the back of the rear wall 25. The front end of the hollow shaft 13 has an annular flange 35 secured to the rear of the dividing head disk 11 by bolts 36. A brake ring 37 is loosely mounted on the enlarged front end of the bearing sleeve 30 for free slidable movement axially thereon, rotation being prevented by a guide pin 39, of which there may be several, projecting therethrough from the front end of the bushing 29. The outer periphery of the brake ring 37 is tapered providing a frusto-conical surface for engaging a similar tapered surface provided on the inside of a larger brake ring 41 which is secured firmly to the back side of the dividing head disk 11 for rotation therewith. The innermost or smaller brake ring 37 is actuated forwardly or backwardly by a brake operator 43 which is externally threaded and screws into the back of the brake ring, also extending back for free rotation on a sleeve 45 on the outside of the stationary bushing 29. A spur gear 48 is secured to the rear end of brake operator by bolts 50 and extends outwardly for rotary manipulation to operate the brake, as shown in Fig. 6, to be subsequently described in detail. By drawing the smaller brake ring 37 rearwardly the outer tapering surface engages firmly in the tapered surface in the larger brake ring 41 secured with the dividing head 11, which is thereby braked or locked. The cylindrical brake operator 43, has an enlarged counterbore in the front end for receiving an axial thrust ball bearing 45' therein. The front end of the stationary bearing bushing 29 is of an enlarged diameter providing a flange 47 for engaging the front side of the thrust bearing 45' for securing the rotating head 11 and assemblage thereon.

An annular actuator member 49 of larger diameter is disposed for free rotation upon the external surface of the cylindrical brake operator 43. The actuator member 49 has at the front end a radially extending flange 51 abutting the rear side of the dividing head disk 11 whereto it is firmly attached and secured as by the screw 53, of which several are provided. Internally of flange 51 is an annular groove wherein the larger brake ring 41 is seated and firmly secured, as by being pressed thereinto. A spur gear 57 is secured to the rear end of the annular actuator member 49 as by a screw 59. A plurality of such clamping screws are provided. The spur gear 57 extends to a larger diameter to be manually rotated for adjusting the angular position of the indexing head 11, in a convenient manner by the arrangement shown in Fig. 7, to be fully described later.

A clear magnified indication is provided for showing the angular position of the dividing head 11 by means of an annular scale 61, which is mounted to rotate therewith or independently thereof and to be locked in any desired position. The annular scale 61 is secured, as by screws 62, to the end of the hub of an adjusting spur gear 63 which is rotatively mounted on the outer surface of the annular actuator member 49 so that the position of the annular scale can be adjusted relatively to the angular position of the dividing head 11, which adjustment is usually desirable to set scale to zero after a work piece has been clamped thereon. To lock the scale driving gear 63 firmly at any desired position relative to the dividing head 11, external threads on the actuator 49 receive internal threads in the hub of a locking gear 65 which is adapted to be screwed into snug locking engagement with the scale adjusting gear 63. A separate washer 67, which may be of a harder metal for snug binding action, is preferably disposed between the hubs of the scale adjusting gear 63 and the locking gear 65.

Scale adjustment is obtained by grasping the middle knob 21 at the front end of the bed plate 17 and drawing it toward the operator which slides forwardly a shaft 69 whereon the knob is secured, as by a pin 71. The shaft 69 extends rearwardly under the bed plate 17, the rear end passing through and being journalled in a gear housing wall 73 extending down from the rear end of the bed plate.

As shown in Figs. 4 and 5, the rear end of the shaft 69 extends into the gear housing where a small spur gear 75 is secured thereon by a pin 77. Also a gear cage 78 is adapted to be slidably moved by the rear end of the shaft 69 on a pair of spaced guide rods or pins 83, see Fig. 5, which extend into the adjacent stationary housing where they are firmly secured. This gear cage 78 encloses the small gear 75 and carries, intermeshed therewith, an idler gear 79 which is journalled on a stud shaft 81 maintained directly thereabove.

When the knob 21 and the shaft 69 are drawn forward, the idler gear 79 is carried away from gear 63 and into mesh with the locking gear 65. The knob is then rotated to loosen the locking gear 65 away from the scale adjusting gear 63. The knob 21 is then pushed back to its extreme rearward position, which may be limited by the hub of the knob engaging the front wall of the base plate 17, and in this position the idler gear 79 is disengaged from the locking gear 65 and is enmeshed with the scale adjusting gear 63. The knob 21 is now turned in either direction to set the scale 61 to zero, or to any other desired position relative to the dividing head 11.

The position of the scale member 61 is conveniently ascertained by the operator observing the optical viewer 85, which is disposed in an aperture in the upper side wall 15' of the housing where it is adjustably secured in a removable sleeve 87 by a spring-pressed ball 89, or other resilient member, so that it can be moved forward or back to obtain a sharp projecting of the graduations of the scale, after the manner of motion picture projectors, for example. To provide a clear direct indication, the annular scale 61 is preferably made of glass, or any other suitable transparent plastic material. Light is projected through the transparent scale 61 from any suitable source such as a light projector housing 91 comprising an electric lamp socket 93 supporting an incandescent electric lamp 95 and mounted in a suitable aperture in the back wall 25. The projector 91 may be firmly secured by an annular retainer 97 of sheet metal, having vent holes 99 therein, and secured by screws 101 to the rear wall 25. A glass member 103 is preferably seated in the aperture in front of the light projector. Also a window glass 105 is provided in the rear end of the aperture in the sleeve containing the optical viewer 85 in close proximity to the scale 61 so that a hair line carried thereon may also be brought into sharp focus with the graduations on the scale. If desired a scale may be graduated on the window 105 having one division less than a given arc on the movable scale so that by the vernier principle accurate observations and measurements may be taken, as will be readily understood.

After the annular scale member 61 has been adjusted precisely to the desired position relative to the indexing head 11, whereon a work piece is disposed, the knob 21 is again drawn to its extreme forward position for meshing the idler gear 79 with locking gear 65 which is turned to snugly lock the annular scale at its adjusted position on the actuator member 49. This operation completed, the knob 21 is then pushed in to its middle or neutral position wherein the idler gear 79 is in a mid-position being disengaged from both the scale adjusting gear and the locking gear, in the position shown in Fig. 4.

To facilitate adjusting the knob 21 to and securing it in any one of these three positions, the front wall of the base is provided with a backwardly projecting boss 107 wherein a hole 109 is drilled up through the shaft bearing aperture toward the upper portion of the base 17. A helical compression spring 111 and a retaining pin 113 are inserted thereinto, as the shaft 69 is passed through, and the shaft is continuously pressed by the lower end of the retainer pin which is rounded or pointed and seats into any one of the three circumferential grooves 115 in the shaft spaced at suitable axial positions to assure that the shaft will be accurately moved axially to the proper desired positions.

To adjust the indexing or dividing head 11 to any desired angular position, the operator releases the brake by grasping the knob 23 on the left-hand side and rotating the locking shaft 117 on which it is secured by a pin 119, as shown in Fig. 6. The locking shaft 117 passes under the bed plate 17 where the rear end passes through the downwardly extending gear wall 73 wherein it is journalled. A small stud gear 121 secured on the rear end of the shaft by a pin 123 meshes with and rotates an idler gear 125 journalled on a stud shaft 127 projecting from a boss 129 on the inside of the rear cover or wall 25, as shown in Fig. 6. The idler gear 125 in turn meshes with and rotates the spur gear 48 which, by screws 50, is secured to and rotates the cylindrical member 43 having the external threads which move the inner brake ring 37 forwardly to disengage the outer brake ring 41. The operator next grasps and rotates the knob 22 on the right-hand side to turn the dividing head 11 in either direction as desired.

As shown in Fig. 7, the knob 22 is secured by a cross pin 131 on the front end of a shaft 133 which passes under the bed plate 17 the rear end extending through the gear housing wall 73' wherein it is journalled. Secured on the rear end of the shaft 133 is a small spur gear 135 which, when in operative position, as in Fig. 7, meshes with an idler gear 137 journalled as a stud shaft 139 projecting frontwardly from a boss 141 on the inside of the back wall 25. The idler gear 137 in turn meshes with and rotates the spur gear 57 which is secured to and rotates the annular actuator member 49 attached to the dividing head 11 which is turned as desired. After adjusting the indexing disk 11 to the desired angular position, the brake knob 23 is turned in a proper direction for applying the brake to securely lock the dividing head. Then the operator draws the knob 22 forwardly to move the small stud gear 135 out of mesh with the idler gear 137 as represented in dotted lines in Fig. 7. On the rear side of the front wall and under the top plate 17, a boss 143 is provided which, as shown in Fig. 7, has a hole 145 drilled from the bottom through the bearing aperture wherein the shaft 133 is journalled toward the upper surface of the bed plate 17. A compression spring 147 and a retainer pin 149, pointed or rounded at the lower end, are inserted in the hole 145 before the shaft is inserted into its bearing. The shaft 133 is provided with two circumferential grooves 151 spaced axially at suitable positions to be respectively engaged by the lower end of the retainer pin 149 as the shaft is shifted backwardly or frontwardly to operative or neutral positions.

A centering plug 13' may be provided in the front end of the hollow shaft 13 to aid in centering work pieces on the indexing or dividing head 11.

It is apparent that within the scope of the invention, modifications and different arrangements may be made other than herein disclosed, and the present disclosure is illustrative merely, the invention comprehending variations thereof.

I claim:

1. A rotary indexing or checking device having in combination, a horizontally disposed bed plate, clamping bolt receiving grooves in said bed plate, an upright structure rising vertically from said bed plate adjacent the rear end thereof, a circular dividing or indexing head, a shaft horizontally and rotatively journalled in said upright structure, said shaft being of sufficient length to project substantially through said upright structure, said dividing head being mounted and secured on the front end of said shaft for adjustable rotation with the face of the head substantially perpendicular to said bed plate, manual actuating means disposed adjacent the front edge of said bed plate for convenient manipulation, manual control means extending from said manual actuating means under said bed plate toward the rear end thereof, and means connecting between said control means and said dividing head for rotating the latter to any desired angular position.

2. A rotary indexing or checking device comprising, a circular dividing or indexing head, a horizontally disposed bed plate, bolt grooves in said bed plate, one of said grooves being disposed along each side of the bed plate, an upright structure rising from said bed plate adjacent one end thereof, means for rotatively journalling said dividing head upon said upright structure for rotation upon a horizontal axis with the surface of the dividing head in a plane substantially perpendicular to said bed plate, means for indicating the angular positions to which said dividing head may be turned relative to said bed plate, brake means for securing said dividing head in any position whence it may be rotated, manual actuating means for angularly adjusting the position of said dividing head to any desired position, and control means extending under the bed plate to the remote end for conveniently controlling said brake means and said actuating means.

3. A rotary indexing or checking device having in combination, a horizontally disposed bed plate, clamping bolt receiving grooves in said bed plate, an upright structure rising vertically from said bed plate adjacent the rear end thereof, a circular dividing or indexing head, a shaft horizontally disposed and rotatively journalled in said upright structure, said shaft being of sufficient length to project substantially through said upright structure, said dividing head being mounted and secured on the front end of said shaft for adjustable rotation with the face of the head substantially perpendicular to said bed plate, an elongated actuating shaft, an elongated brake shaft, said actuating and brake shafts being rotatively journalled in spaced parallel relation under said bed plate extending from front to back and projecting outwardly at the front ends for convenient manipulation by an operator, drive means connecting from the rear end of said actuating shaft for rotating said dividing head, and brake means connected to the rear end of said brake shaft for securing or releasing said dividing head.

4. In combination in a rotary indexing or layout checking device, a dividing or indexing head of a generally disk shape, a base structure, means for rotatively supporting said dividing head in an exposed position upon said base structure, a scale ring for indicating the angular position of said dividing head, means for adjustably connecting said scale ring to said dividing head so that it can be set to zero for any angular position of the head, releasable securing means for firmly securing the scale ring to the dividing head in any adjusted position, actuating means for adjusting the angular position of said dividing head, releasable securing means for firmly locking the head stationary in any adjusted position, and control members extending from each of said releasable securing means and said actuating means to conveniently juxtaposed positions so that an operator may conveniently move and secure the indexing head and the scale ring thereon to any desired position and further characterized by said base structure comprising a substantially horizontal bed plate having an upright structure rising from the rear end, said dividing head being rotatively supported on said upright structure, the control members from said scale ring adjusting and securing means extending under said bed plate to the front end, and the control member for adjusting the angular position of said dividing head extending under said bed plate to the front end.

5. A rotary indexing or checking device comprising, a circular dividing or indexing head, a horizontally disposed bed plate, an upright structure rising upwardly from said bed plate adjacent the rear end thereof, means for rotatively journaling said dividing head upon said upright structure for rotation upon a horizontal axis with the surface of the dividing head in a plane substantially perpendicular to said bed plate, means for indicating the angular positions to which said dividing head may be turned relative to said bed plate, an elongated indexing shaft, an elongated brake shaft, said indexing and brake shafts being rotatively journalled in spaced parallel relation under said bed plate extending from front to back and projecting outwardly at the front ends for convenient manipulation by an operator, drive means connecting from the rear end of said indexing shaft for rotating said dividing head, and brake means connected to the rear end of said brake shaft for securing or releasing said dividing head.

6. A rotary indexing or checking device having in combination, a horizontally disposed bed plate, clamping bolt receiving grooves in said bed plate, an upright structure rising vertically from said bed plate adjacent the rear end thereof, a circular dividing or indexing head, a shaft horizontally disposed and rotatively journalled in said upright structure, said shaft being of sufficient length to project substantially through said upright structure, said dividing head being mounted and secured on the front end of said shaft for adjustable rotation with the face of the head substantially perpendicular to said bed plate, manual indexing means disposed adjacent the front edge of said bed plate for convenient manipulation, control means extending from said manual indexing means under said bed plate toward the rear end thereof, means connecting between said control means and said dividing head for rotating the same to any desired angular position, a first brake ring secured to the rear side of said dividing head in concentric relation to the shaft, tapering frusto-conical brake surfaces on said brake ring, a second brake ring disposed concentric to said shaft and having frusto-conical brake surfaces adapted to engage the brake surfaces on said first brake ring, and means slidably mounting said second brake ring to move to engage or disengage the first brake ring, and brake actuating means extending therefrom to the front end of said bed plate for convenient manipulation.

7. In a rotary indexing or checking device the combination according to claim 3 and including, a scale ring calibrated for indicating the angular position of said dividing head, means for mounting said scale ring in a cooperative relation with said head, adjusting means for moving the scale ring relatively to the head so that it may be set to zero for any desirable angular position of the head, conveniently disposed releasable securing means for firmly securing the scale ring to the head at any adjusted position, a light source for illuminating said scale, and a magnifying viewer for providing a clear magnified view of the illuminated scale.

8. In a rotary indexing or checking device the combination according to claim 5 and including, a scale ring calibrated for indicating the angular position of said dividing head, means for mounting said scale ring in a cooperative relation with said head, adjusting means for moving the scale ring relatively to the head so that it may be set to zero for any desired angular position of the head, conveniently disposed releasable securing means for firmly securing the scale ring to the head at any adjusted position, a light source for illuminating said scale, and a magnifying viewer for providing a clear magnified view of the illuminated scale.

9. In a rotary indexing or checking device the combination according to claim 6 and including, a scale ring calibrated for indicating the angular position of said dividing head, means for mounting said scale ring in a cooperative relation with said head, adjusting means for moving the scale ring relatively to the head so that it may be set to zero for any desirable angular position of the head, conveniently disposed releasable securing means for firmly securing the scale ring to the head at any adjusted position, a light source for illuminating said scale, and a magnifying viewer for providing a clear magnified view of the illuminated scale.

HERMAN A. KRUEGER.